Sept. 2, 1958 G. C. GILLIAM 2,849,898
APPARATUS FOR SETTING SAW TEETH
Filed Feb. 20, 1957 3 Sheets-Sheet 1
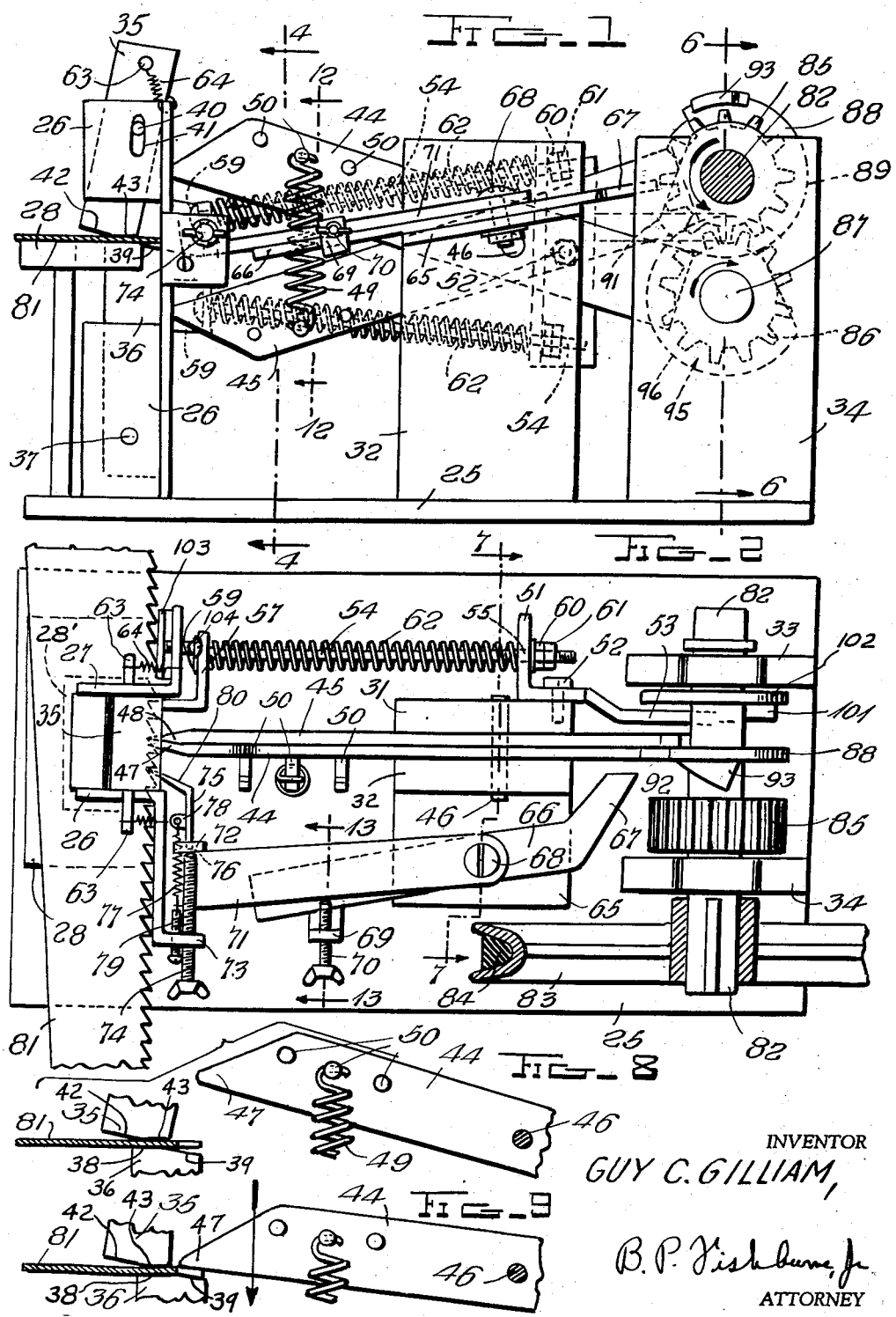
INVENTOR
GUY C. GILLIAM,
B. P. Fishburne, Jr.
ATTORNEY Sept. 2, 1958  G. C. GILLIAM  2,849,898
APPARATUS FOR SETTING SAW TEETH
Filed Feb. 20, 1957  3 Sheets-Sheet 2
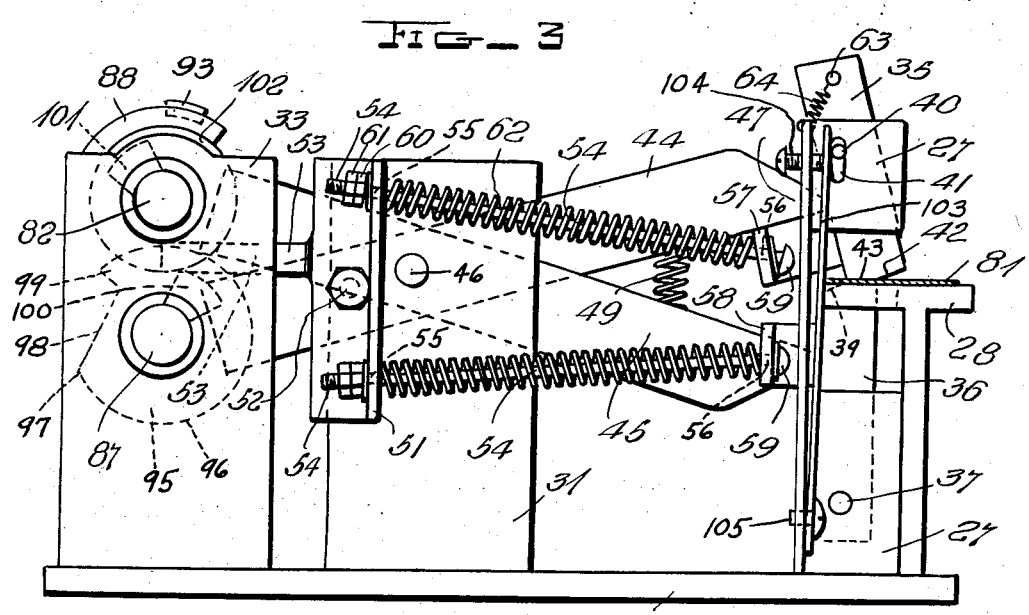
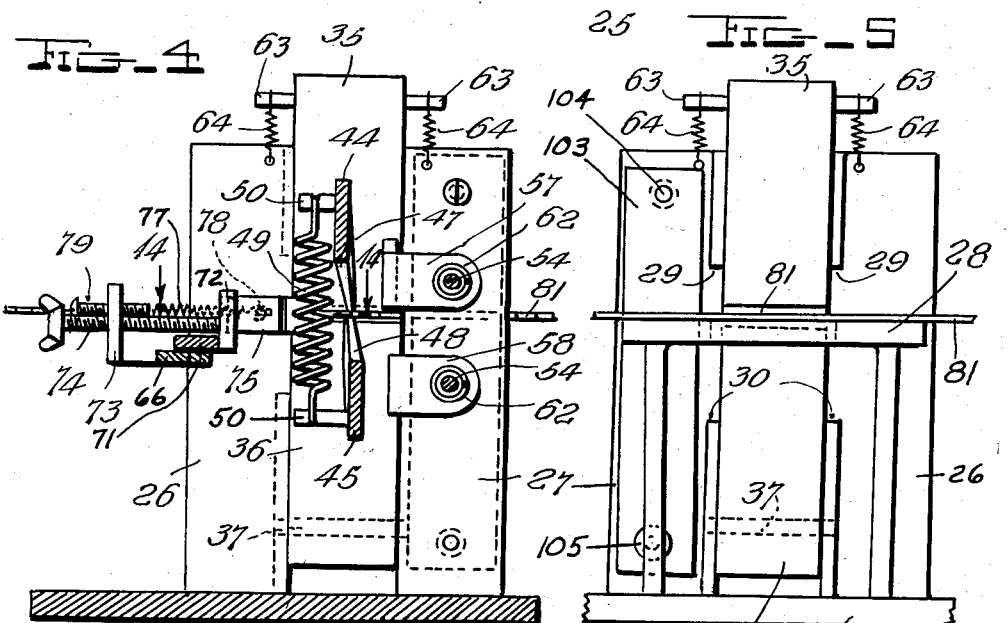
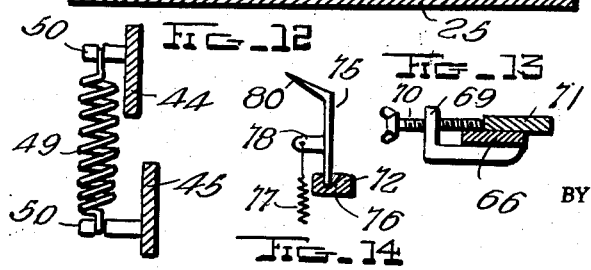
INVENTOR
GUY C. GILLIAM,
BY B. P. Fishburne, Jr.
ATTORNEY Sept. 2, 1958   G. C. GILLIAM   2,849,898
APPARATUS FOR SETTING SAW TEETH
Filed Feb. 20, 1957   3 Sheets-Sheet 3
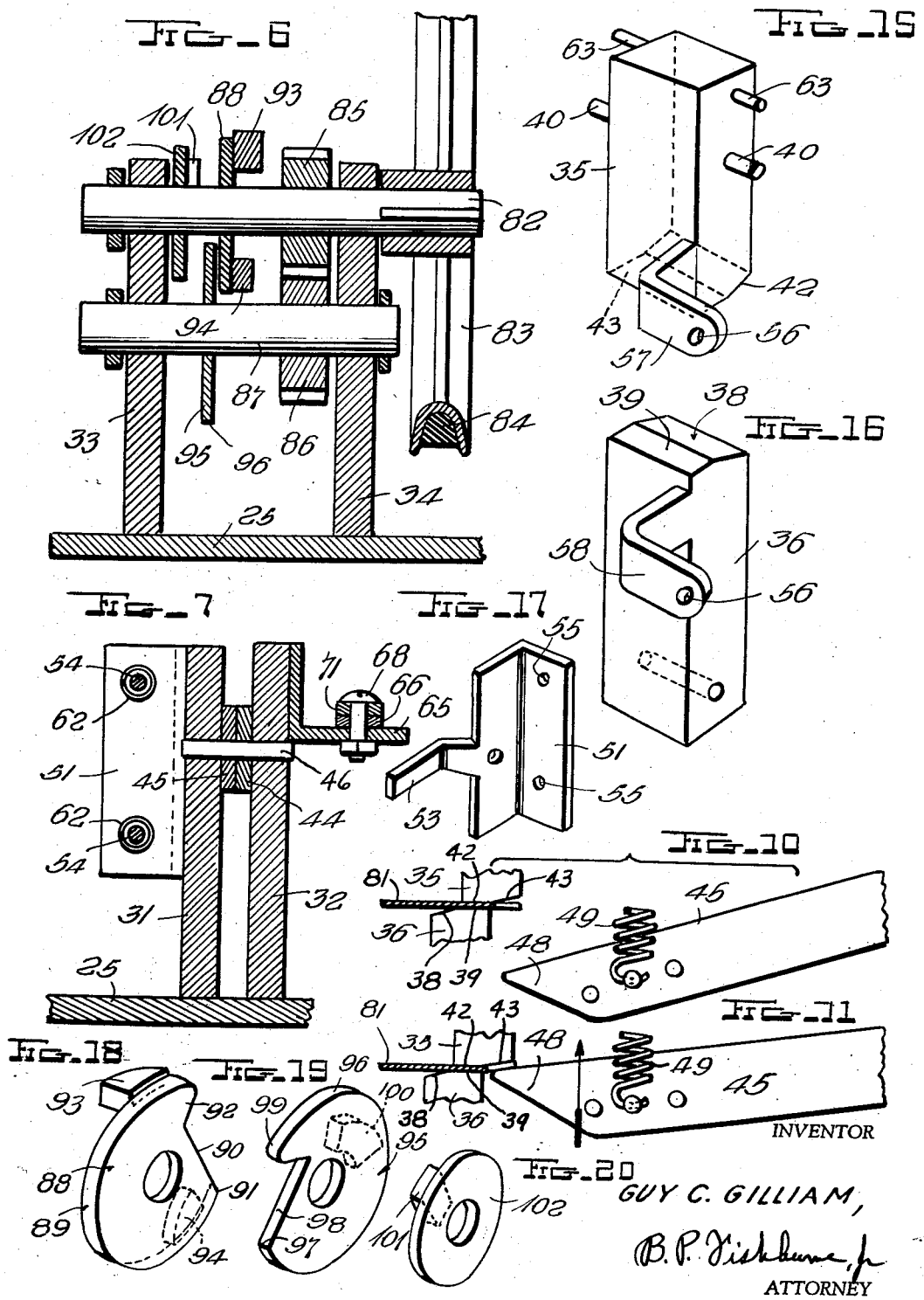
INVENTOR
GUY C. GILLIAM,
ATTORNEY United States Patent Office 2,849,898
Patented Sept. 2, 1958

2,849,898

APPARATUS FOR SETTING SAW TEETH

Guy C. Gilliam, Greenville, S. C.

Application February 20, 1957, Serial No. 641,311

12 Claims. (Cl. 76—62)

The present invention relates to apparatus for setting saw teeth.

A primary object of the invention is to provide a saw setting apparatus or machine of novel and simplified construction, and with an improved mode of operation, whereby the saw teeth may be rapidly and accurately set in a highly efficient manner.

A further object of the invention is to provide saw setting apparatus adapted to set the teeth of straight, circular and band saws, the apparatus having means to provide a number of accurate essential adjustments, for the purpose of enabling the apparatus to handle various sizes and types of saws, and also rendering it possible to provide a particular saw with the desired degree of set for its teeth.

A further and more specific object is to provide saw setting apparatus having a novel construction and mode of operation, particularly as regards cooperating pairs of anvils and power hammers, and a feed means for advancing the saw through the apparatus as the teeth are set.

A still further object of the invention is to provide apparatus of the above-mentioned character which is reliable and efficient in operation, rugged and durable in construction, easy to adjust and maintain, and relatively inexpensive to manufacture.

Other objects and advantages of the invention will be apparent during the course of the following description.

In the accompanying drawings forming a part of this application and in which like numerals are employed to designate like parts throughout the same, Figure 1 is a side elevation of saw setting apparatus embodying the invention, parts in section.

Figure 2 is a plan view of the apparatus with parts in section.

Figure 3 is a side elevation opposite to that shown in Figure 1.

Figure 4 is a transverse vertical section taken on line 4—4 of Figure 1.

Figure 5 is a fragmentary front elevational view of the apparatus, parts omitted.

Figure 6 is a fragmentary vertical section taken on line 6—6 of Figure 1.

Figure 7 is a vertical section taken on line 7—7 of Figure 2.

Figure 8 is a fragmentary side elevational view showing the relationship between the saw, upper hammer and upper and lower anvils while the upper hammer is in the normal position.

Figure 9 is a similar view showing the relationship between the last-mentioned elements when the upper hammer is in the down or striking position.

Figure 10 is a fragmentary side elevational view similar to Figure 8 and showing the relationship between the saw, upper and lower anvils and lower hammer, when the latter is in the normal position.

Figure 11 is a further view similar to Figure 10 showing the relationship of the last-mentioned elements when the lower hammer is in the raised or striking position.

Figure 12 is a fragmentary vertical cross section through the upper and lower hammers taken substantially on line 12—12 of Figure 1.

Figure 13 is a fragmentary vretical section taken on line 13—13 of Figure 2.

Figure 14 is a fragmentary horizontal section taken on line 14—14 of Figure 4.

Figure 15 is a perspective view of the upper anvil removed.

Figure 16 is a perspective view of the lower anvil.

Figure 17 is a perspective view of a pivoted cam actuated bracket removed.

Figure 18 is a perspective view of an upper hammer and saw feeding cam.

Figure 19 is a perspective view of a lower hammer and anvil actuating cam.

Figure 20 is a perspective view of a separate anvil actuating cam.

In the drawings, the numeral 25 designates a rigid base or support plate adapted to be fixedly secured to a work bench or the like. A pair of upstanding vertical anvil mounting posts 26 and 27 are rigidly secured to the base plate 25 near its forward end by welding or the like. The upstanding posts 26 and 27 are spaced apart and parallel and preferably L-shaped in cross section as shown in Figure 2. As shown in the drawings, a horizontal table extension 28 is built upon the base plate 25 directly forwardly of the posts 26 and 27, and this table extension may be formed integral with the posts, if preferred. The table extension 28 is at the proper elevation to position the saw properly between the movable anvils of the apparatus, to be described. The forwardly projecting flanges of the L-shaped posts 26 and 27 are preferably cut back at 29 and 30, above and below the table extension 28.

A pair of rigid spaced opposed upstanding vertical plates 31 and 32 are rigidly secured by welding or the like to the base plate 25, centrally thereof, and a considerable distance rearwardly of the posts 26 and 27. As will be seen, the mounting plates 31 and 32 constitute the support or mounting for the saw setting hammers, the adjustable saw feeding mechanism and the anvil turning or pivoting mechanism.

Rearwardly of the vertical plates 31 and 32 and adjacent the rear end of the base plate 25, a further pair of spaced apart rigid vertical mounting plates 33 and 34 extend above the plate 25 and have their lower ends rigidly secured thereto by welding or the like. The vertical plates 33 and 34 are spaced apart a greater distance than the plates 31 and 32, Figures 6 and 7. The plates 33 and 34 form the support 4 the drive and rotary cam means of the apparatus, as will be apparent.

Arranged between the posts 26 and 27 are upper and lower pivoted anvils 35 and 36. These anvils preferably fit snugly between the posts 26 and 27, but are adapted to have limited vertical swinging movement. The lower anvil 36 is pivoted to the posts 26 and 27 near their lower ends by a horizontal pivot pin 37, the lower end of the anvil 36 being spaced above the base plate 25. The lower anvil 36 has an upper angled saw gripping face 38 and a working face 39 forming an obtuse angle therewith, as shown. The anvil faces 38 and 39 are at the elevation of the table extension 28 during the operation of the apparatus, and the table extension is cut away at 28' to receive the lower anvil.

The upper anvil 35 is pivoted between its ends to the posts 26 and 27 near the tops of the latter, by a horizontal pin 40, rigid with the anvil 35 and extending through short vertical slots 41, formed in the posts near their upper ends. In this manner, the upper anvil 35 is mounted for pivotal and limited vertical movement. The upper anvil has a lower saw gripping face 42 which is angled away from the corresponding face 38 of the lower anvil, and a working face 43 arranged at an obtuse angle to the face 42. The saw gripping faces 38 and 42 grip and hold the saw while its teeth are being set against the working faces 39 and 43, as will be further described.

Cooperating with the upper and lower anvils 35 and 36 are upper and lower saw tooth setting hammers 44 and 45. The hammers 44 and 45 are disposed in side-by-side contacting relation between the vertical plates 31 and 32 and pivoted thereto intermediate the ends of the hammers for vertical swinging movement by a single transverse horizontal pin 46. The hammers 44 and 45 have their outer sides slidably contacting the inner faces of the plates 31 and 32, and are mounted for scissors-like action in vertical planes between the plates 31 and 32. The hammers 44 and 45 are elongated, as shown, and extend forwardly and rearwardly of the vertical plates 31 and 32. The forward extremities of the hammers 44 and 45 are tapered as shown at 47 and 48, and at their forward ends the hammers are bent laterally in opposite directions, Figure 4, so that their forwardmost striking points overlie each other, Figure 4, for alternately striking successive saw teeth during the operation of the apparatus. The hammers 44 and 45 are arranged so that their forward tips may strike the saw engaging working faces 39 and 43 of the anvils, as will be further described. Between their forward ends and their pivot 46, the hammers 44 and 45 are resiliently urged together vertically by a relatively strong retractile coil spring 49 having its upper and lower ends detachably secured to pins 50 carried by corresponding sides of the hammers 44 and 45. As shown in the drawings, each hammer is preferably provided with three or more of the pins 50, arranged in longitudinally spaced relation thereon so that the spring 49 may be attached to the hammers 44 and 45 at points closer to or further away from the pivot 46, so as to vary the striking force of the hammers upon the anvils and work.

Means are provided to swing the upper and lower anvils 35 and 36 upon their pivots. This means comprises an L-shaped bracket 51 pivoted to the outer side of the vertical plate 31 intermediate its ends as shown at 52. The bracket 51 carries a rearwardly projecting and laterally offset actuator arm 53, integral therewith, and this arm 53 projects rearwardly between the vertical plates 31 and 32 and is close to the inner face of the plate 31 as shown in Figure 2. The actuator arm 53 is adapted to swing vertically in opposite directions under the influence of rotary cam means to be described. When the arm 53 is thus actuated, the bracket 51 will swing upon its pivot 52.

Long screws 54 have their rear ends engaging through openings 55 in the pivoted bracket 51, and the forward ends of these screws engage through openings 56 of L-shaped extensions 57 and 58 carried by the anvils 35 and 36 respectively, and preferably formed integral therewith. The screws 54 have heads 59 arranged forwardly of the extensions 57 and 58, and the long screws 54 carry adjusting and lock nuts 60 and 61 at their rear ends and adjacent to the rear side of the bracket 51. Between the bracket 51 and the extensions 57 and 58, the long screws 54 are surrounded by long compressible coil springs 62 which have their ends bearing against the bracket 51 and the extensions 57 and 58, as indicated. The springs 62 serve to take up any play in the apparatus between the pivoted bracket 51 and the pivoted anvils 35 and 36.

The upper anvil 35 is provided upon opposite sides and near its top end with a pair of pin elements 63, rigidly secured thereto, and a pair of retractile coil springs 64 have their upper ends attached to the pin elements 63 and their lower ends attached to the tops of posts 26 and 27. These springs serve to resiliently hold the upper anvil in contact with the lower anvil or the saw which is arranged between the two anvils.

Means are provided to feed the saw one tooth at a time between the upper and lower anvils in properly timed relation with the movements of the anvils and hammers. This means comprises an L-shaped bracket 65, rigidly secured to the outer side of the vertical plate 32 near the top of the latter by welding or the like. Pivoted upon the bracket 65 for movement in a generally horizontal plane is a saw feed lever 66 having a rear inwardly angled extension 67 integral therewith. The lever 66 extends forwardly and rearwardly of its pivot 68 upon the bracket 65, and near its forward end the lever 66 carries an upstanding L-shaped extension 69, rigid therewith. A horizontal adjusting screw 70 has screw-threaded engagement with the extension 69 and is arranged just above the lever 66 for engagement with a secondary lever 71, having its rear end pivoted to the element 68 and thus being swingable relative to and above the lever 66. The adjusting screw 70 engages the outer longitudinal edge of the secondary lever 71 to adjust it angularly with respect to the lever 66. The secondary lever 71 is provided at its forward end and upon its inner side with an upstanding lug 72, rigid therewith, and a rearward extension 73 on the post 26 has a screw-threaded opening receiving a second adjusting screw 74, which extends across the top of the lever 71, rearwardly of the post 26, and engages the upstanding lug 72 to adjust or turn both levers 66 and 71 upon the common pivot 68.

A saw feed dog 75 has its rear end pivoted at 76 to the lug 72, and this feed dog is resiliently held in contact with the saw teeth and the lug 72 by a retractile coil spring 77, having one end connected with the feed dog at 78, and its opposite end connected with an adjusting screw 79, having screw-threaded engagement within an opening of the extension 73, below the screw 74. The feed dog 75 includes a forwardly projecting tapered saw tooth engaging element 80. The feed dog 75 is located just rearwardly of the upper and lower anvils, and spans the opposed working faces of the anvils so as to engage the teeth of the saw 81 disposed between the anvils.

Journaled upon the rear upstanding plates or supports 33 and 34, near the tops of the latter, is a horizontal transverse rotatable drive shaft 82, provided upon one end and outwardly of the plate 34 with a vertically disposed drive pulley 83, rigidly secured thereto. The pulley 83 is driven by a belt 84 or the like, connected with a suitable driving motor or other source of power, not shown. Inwardly of the plate 34, the drive shaft 82 has a gear 85 rigidly secured thereto and meshing with a gear 86, disposed directly below the same, and rigidly mounted upon a horizontal transverse shaft 87, which is also journaled for rotation upon the plates 33 and 34, below the shaft 82 and parallel therewith.

A combined upper hammer and saw feed operating cam 88 is secured to the shaft 82 for rotation therewith, inwardly of the gear 85 and substantially midway between the plates 33 and 34. The cam has a concentric circular periphery 89 engaging the top of the upper hammer 44 near its rear end and normally holding the forward end of the upper hammer in the elevated position shown in Figure 1, wherein the forward tip 47 of the hammer is poised above the saw and lower anvil. The cam 88 is recessed or notched at one side to provide a straight cordal edge 90 and a relatively abrupt hammer trip shoulder 91. The cam 88 is further provided with a tapered and rounded hammer reset portion 92, opposite the shoulder 91, which upon further rotation of the cam 88, causes the upper hammer 44 to quickly return to the normal elevated position shown in Figure 1, after the upper hammer has struck and set a particular saw tooth. The cam 88 is additionally provided upon one side and near its periphery with a pair of tapered cam elements 93 and 94 adapted to contact the lever extension 67 as the shaft 82 rotates, for turning the lever 66 upon its pivot 68 and advancing the saw 81 tooth-by-tooth through the apparatus. The cam parts 93 and 94 are substantially 180 degrees apart circumferentially of the cam 88.

A combined lower hammer and anvil actuating cam 95 is rigidly mounted upon the shaft 87 to turn therewith, and this cam has a circular periphery 96 engaging the bottom side of the lower hammer 45 near the rear end of the latter for the purpose of normally holding the forward tip 48 of the lower hammer in the lowered position shown in Figures 1 and 3. The cam 95 is notched similarly to the cam 88 for providing an abrupt hammer trip or drop off shoulder 97 and straight edge portion 98. The cam 95 is further formed to provide a tapered rounded hammer reset portion 99 similar to the cam portion 92, and serving to rapidly return the lower hammer 45 to its normal position of Figure 1, after the lower hammer has tripped over the shoulder 97 and its forward end has swung upwardly to contact the teeth of the saw held against the upper anvil 35. Upon its side remote from the gears 85 and 86, the cam 95 carries a cam part 100, rigid therewith, and rotating in the path of travel of the bracket arm 53 so as to contact the lower side of the same and elevate the arm 53 for turning the bracket 51 upon its pivot 52 in a clockwise direction, Figure 3. When this occurs, the upper anvil 35 will be turned through the medium of its extension 57 to the inclined position shown in Figure 3, while the lower anvil 36 will be held in the upright or vertical position through the medium of its extension 58 and associated parts.

An additional anvil actuating cam part 101 is rigidly mounted upon a disc 102, in turn rigidly mounted upon the upper shaft 82 to turn therewith. The disc 102 is disposed just inwardly of the vertical plate 33 and near the side of the cam 96 having the cam part 100. The cam element 101 rotates in the path of travel of the bracket arm 53 and is adapted to contact the upper side of this arm, Figure 3, for pivoting the bracket 51 in a counter-clockwise direction and thereby causing the upper anvil 35 to assume a vertical position, while the top end of the lower anvil is swung outwardly from the vertical as will be further explained.

A resilient generally vertical gage plate 103 is arranged forwardly of the post 27, Figures 2 and 3, and secured to the post as at 105, near the bottom thereof. An adjusting screw 104 regulates the spacing of the gage plate from the post 27 and the saw teeth engage the adjustable gage plate as shown in Figures 2 and 3, so that teeth of different depths may be properly presented to the striking hammers for setting.

*Operation*

The saw 81 is positioned between the upper and lower anvils 35 and 36 with its teeth directed inwardly and engaging the front faces of the upstanding post 26 and adjustable gage 103, Figures 1 and 2. The saw rests upon the table extension 28 and slides longitudinally thereon during the operation of the apparatus. The saw 81 may be held or guided by hand in engagement with the post 26 and 27 or, if preferred, mechanical means may engage the saw to hold it in sliding engagement with the posts during its step-by-step movement through the apparatus.

The degree of set or bending of the individual saw teeth is adjustable by means of the long screws 54 and the nuts 60 and 61. By adjusting these elements, the extent of turning of the anvils 35 and 36 upon their pivots 40 and 37 may be varied, and consequently the angles of the working faces 43 and 39 of the anvils at the time that the hammers strike the saw teeth may be varied. The amount of turning of the bracket 51 upon its pivot 52 under the influence of the cam elements 101 and 100 is constant, and adjustment of the turning or pivoting of the anvils is controlled entirely by means of the screws 54, as stated. Since it is the angle assumed by the working faces 39 and 43 of the anvils which determines the amount of set imparted to the saw teeth when struck by the hammers 44 and 45, it is the adjustment above-described with the long screws 54 which ultimately controls the amount of set imparted to the saw teeth by the apparatus.

Prior to starting the apparatus, a further adjustment may be made with the screw 70 to effect pivoting of the lever 71 relative to the lever 66, in Figure 2. This adjustment regulates the distance which the saw 81 is advanced by the feed dog 75 upon each contact of the lever extension 67 with one of the cam elements 73 and 74. Additionally, the adjusting screw 74 is regulated to turn both levers 66 and 71 slightly upon their common pivot 68, and this adjustment compensates for various sizes of saw teeth or the spacing between adjacent saw teeth in particular saws being handled by the apparatus. Finally, prior to beginning the actual saw setting operation, the hammer spring 49 is connected with the desired pair of pins 50 to regulate the force or power of the hammers. For thicker saw blades, it will be necessary to utilize more power, and the spring 49 will be connected with the pins 50 which are forwardmost upon the hammers 44 and 45. For thinner saw blades, the spring is connected with the rearmost pair of pins 50, and this will soften the striking force of the hammers upon the saw teeth.

After the above adjustments have been made, and with the saw 81 properly positioned so that the feed dog 75 engages between adjacent saw teeth as shown in Figure 2, power is applied to the pulley 83 for turning the shafts 82 and 87 and the apparatus will begin to set the saw teeth.

The shaft 82 turns counter-clockwise, Figure 1, and the shaft 87 will turn clockwise due to the gearing 85—86. Whenever one of the cam elements 93 or 94 engages the lever extension 67, levers 66 and 71 will be turned clockwise upon their pivot 68, Figure 2, and the feed dog 75 advances the saw 81 a distance equal to a single tooth spacing or one tooth. When this occurs, the spring 77 is stretched and when the cam element 93 or 94 clears the lever extension 68, the spring 77 will quickly retract levers 66 and 71 and the feed dog 75 to their normal positions, Figure 2, wherein the feed dog is clear of the hammers 44 and 45. A tooth of the saw 81 will now be positioned accurately in the path of the vertically swinging hammers to be set by one such hammer.

Continued turning of the shaft 82 carries the cam element 101 into engagement with the top of arm 53 and this swings the arm downwardly or counter-clockwise, Figure 3. The upper anvil 35 has its lower end swung inwardly toward the posts 26 and 27 and the upper anvil is held substantially vertically, although its working face 43 is inclined somewhat from the horizontal, Figure 10. Simultaneously, the top end of the lower anvil 36 is swung outwardly so that the working face 43 of the upper anvil overhangs the inner side of the lower anvil and is in the path of travel of the lower hammer 45, now poised to move upwardly and strike a saw tooth against the working face 43 of the upper anvil, Figure 10.. It may be observed in Figure 10 that the gripping face 42 of the upper anvil now coacts with the working face 39 of the lower anvil to grip or hold the saw 81 during the saw tooth setting operation. The upper anvil is resiliently held in downward gripping engagement with the saw by the springs 64. The angle of the working face 43 of the upper anvil is controlled by the pivoted bracket 51 and associated adjusting means, and this determines the amount of set imparted to each saw tooth by the lower hammer 45.

Continued turning of the shaft 82 in the same direction will next cause the cam 95 to reach the point where the shoulder 97 passes from the trailing end of the lower hammer 45. As this happens, the strong spring 49 will instantly raise the forward end of the lower hammer so that its forward striking portion 48 will engage the saw tooth and bend it upwardly against the angled working face 43 of the upper anvil. As soon as this takes place, continued turning of the shaft 82 causes the cam portion 99 to return the lower hammer 45 to its normal position shown in Figures 1 and 3.

Continued turning of the shaft 82 will bring the next cam element 93 or 94 into contact with the lever extension 67 and the feed dog 75 again advances the saw 81 one step or one tooth, and the next saw tooth is positioned in the path of movement of the upper hammer 44. Continued turning of the shaft 82 causes the particular cam element 93 or 94 to clear the lever extension 67, and the feed dog 75 is again retracted to its normal position by the spring 7.

Further rotation of the shaft 82 brings the cam part 100 into contact with the bottom side of the arm 53 for turning the bracket 51 clockwise upon its pivot 52, Figure 3. This action causes the upper end of the lower anvil 36 to swing rearwardly toward the vertical posts 26 and 27 and the lower anvil assumes a generally vertical position, although its top working face 39 is inclined to effect the setting of the saw tooth upon it when struck by the upper hammer 44. Simultaneously, the upper anvil 35 has its lower end swung outwardly or away from the hammers 44 and 45 so that the working face of the lower anvil is uncovered when the saw tooth is struck by the hammer 44, see Figure 9. Further rotation of the shaft 82 causes the cam 88 to turn sufficiently to allow the lower trailing end of the upper hammer 44 to trip over the shoulder 91, and when this occurs, the spring 49 instantly draws the forward end 47 of the upper hammer downwardly for striking the saw tooth and setting it against the working face 39 of the lower anvil in the manner shown in Figure 9. The upper hammer 44 thus sets alternate teeth of the saw in the direction opposite to that in which they are set by the lower hammer 45, as previously described in connection with Figures 10 and 11. The upper and lower hammers 44 and 45 act upon alternate saw teeth of the saw 81 to set them in opposite directions.

It may be observed in Figures 8 and 9 that while a particular tooth is being set by the upper hammer 44 against the working face 39 of the lower anvil, the gripping face 38 of the lower anvil is cooperating with the working face 43 of the upper anvil to hold the saw stationary. The working face 43 of the upper anvil is retracted or in the inactive position, Figure 8, so that the lower working face 39 is uncovered and in the path of travel of the upper hammer. As soon as the upper hammer 44 strikes its blow, continued rotation of the shaft 82 will cause the cam part 92 to return the upper hammer to its normal elevated position, and the trailing end of the upper hammer will again ride upon the circular periphery 89 of the cam 88 and be held by the cam in the normal elevated position. The above-described cycle of operation repeats itself and continues as long as the shaft 82 rotates counter-clockwise as indicated by the arrow in Figure 1.

While the apparatus is illustrated in use and described in connection with the setting of a straight or cross cut saw, it is entirely feasible to utilize the apparatus for setting the teeth of circular saws and band saws. In such cases, special supporting means, separate from the apparatus as illustrated and not shown in the present drawings, are employed for supporting the circular or band saws with their teeth properly positioned in the apparatus to be engaged in the same manner above-described by the feed dog 75 and the hammers 44 and 45.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described the invention, I claim:

1. Apparatus for setting saw teeth comprising supporting means, a pair of anvils pivotally mounted upon the supporting means and having opposed working faces, movable means connected with said anvils to turn them upon their pivots so that one anvil is rendered active while the other anvil is inactive, a pair of opposed hammers for coaction with the anvils pivoted to the supporting means and adapted to strike the working faces of the anvils, movable saw feed means to advance the saw through the apparatus, and cam means to operate said feed means pivoted hammers and movable means in timed relation.

2. Saw setting apparatus comprising supporting means, a pair of opposed anvils pivoted to the supporting means and having working faces to engage the opposite sides of the saw and against which the teeth of the saw are struck for setting them at the proper angle, feed dog means engaging the teeth of the saw to advance it tooth-by-tooth between said anvils, movable means connected with the anvils to turn them upon their pivots substantially in unison so that one anvil is shifted to a working position and the other anvil is shifted to an inactive position, a pair of hammers pivoted to the supporting means for coaction with said anvils, and rotary cam means for actuating said hammers, feed dog means and said movable means in timed relation, whereby the hammers will alternately strike successive saw teeth when the same are supported by the working faces of said anvils.

3. Saw setting apparatus comprising supporting means, a pair of anvils pivoted to the supporting means and having opposed working faces to engage the opposite sides of the saw and against which the teeth of the saw are struck for setting the same, feed dog means pivoted to the supporting means and engaging the teeth of the saw to advance the saw tooth-by-tooth, a member pivoted to the supporting means, adjustable interconnecting means between said member and pivoted anvils to regulate the degree of turning of the anvils upon their pivots, a pair of opposed hammers pivoted to the supporting means for striking engagement with the working faces of the anvils, and rotary cam means for operating the pivoted feed dog means, hammers and pivoted member in timed relation.

4. Saw setting apparatus comprising supporting means, a pair of anvils pivoted to the supporting means and having working faces, a lever pivoted to the supporting means and swingable in a plane generally parallel with said working faces, a feed dog carried by said lever for engagement with the saw teeth to advance the saw through the apparatus, a spring connected with said feed dog and lever to retract the same after the feed dog advances the saw one step, means for adjusting the travel of the feed dog and lever, a member pivoted to the supporting means, adjustable means connecting said pivoted member with said anvils and adapted to regulate the extent of turning of the anvils upon their pivots, a pair of movable hammers associated with the anvils for striking the saw teeth against the working faces of the anvils to set such teeth, and timed rotary cam means connected with said lever, pivoted member and hammers to actuate the same in the proper sequence.

5. Saw setting apparatus comprising a pair of spaced upstanding posts, upper and lower anvils pivotally mounted between said posts and having opposed working faces, a pair of upstanding members spaced from said posts, a pair of hammers pivoted between the last-named members for vertical swinging movement, resilient means connecting said hammers and urging them together and toward the working faces of the anvils, adjustable means connected with the anvils for turning them upon their pivots a desired amount, movable saw feeding means, and rotary cam means engageable with said adjustable means, hammers and saw feeding means to actuate the same.

6. Saw setting apparatus comprising a pair of spaced uprights, upper and lower anvils movably mounted between the uprights and having opposed working faces, an upstanding support member spaced from said uprights, a pair of hammers pivoted intermediate their ends to said support member and having corresponding ends swingable toward engagement with the working faces of the anvils, a spring connected with the pivoted hammers for urging them toward striking engagement with said working faces, a lever pivotally secured to said support member, adjustable feed dog means carried by said lever and adapted to engage the teeth of the saw, a spring associated with the lever and feed dog means to retract the same, an element pivoted to said upstanding support member, adjustable means interconnecting said pivoted element and anvils, a rotary shaft, a second rotary shaft geared to the first-mentioned shaft to turn in unison therewith, and cams mounted upon said first-named and second shafts for operating said hammers, pivoted lever and pivoted element in timed relation.

7. Saw setting mechanism comprising a pair of opposed pivoted anvils, a pair of pivoted hammers for coaction with the working faces of said anvils, pivoted feed dog means for advancing the saw in the mechanism, pivoted means connected with said pivoted anvils to turn the latter upon their pivots in opposite directions, a first rotary cam engaging one of said hammers to actuate the same, a pair of cam elements carried by said first cam and adapted to engage the pivoted feed dog means to operate the same, a second rotary cam engaging the other hammer to actuate it, an element carried by said second cam adapted to engage said pivoted means to turn the same in one direction, a rotary cam element adapted to engage the pivoted means for turning it in an opposite direction, and means to turn said cams and cam element in unison.

8. Saw setting mechanism comprising supporting means, upper and lower anvils pivoted to the supporting means and having opposed working faces shiftable into offset relation, whereby one working face is rendered active while the other working face is inactive, extensions carried by said anvils, an element pivoted to said supporting means, adjustable means interconnecting said extensions and element, whereby turning of the element upon its pivot in one direction shifts the anvils upon their pivots in opposite directions a desired amount, upper and lower movable hammers carried by the supporting means and adapted to engage said working faces when the latter are in the active position, means to feed the saw through the mechanism step-by-step, and power-operated means to actuate the last-named means, hammers and said pivoted element.

9. Saw setting apparatus comprising a pair of upstanding members, upper and lower anvils pivoted between said members and having opposed working faces, upstanding support means spaced from said members, upper and lower crossed vertically swingable hammers, common pivot means for the hammers upon said support means intermediate the ends of the hammers, the hammers projecting forwardly and rearwardly of the support means, a spring connecting said hammers forwardly of their pivot means and urging the forward ends of the hammers toward each other, an element pivotally mounted upon said supporting means and having an actuating arm, means interconnecting said element and said anvils, separate cam elements engageable with opposite sides of said actuating arm to rock said element in opposite directions upon its pivot, means to feed the saw step-by-step in the apparatus, and cam means associated with said hammers to normally hold their forward ends separated and releasing the hammers so that the spring can shift one hammer toward the other.

10. Apparatus for setting saw teeth comprising supporting means, a pair of opposed anvils pivotally mounted upon the supporting means, each anvil having a saw gripping face and a working face arranged at an angle to the saw gripping face, movable means connected with said anvils to turn them upon their pivots so that one anvil is rendered active while the other anvil is inactive, a pair of opposed hammers movably mounted upon the supporting means and having parts adapted to strike the saw teeth and set them against the working faces of the anvils, movable saw feed means to advance the saw step-by-step between the anvils, and cam means to operate the feed means, hammers and movable means in timed relation, the arrangement being such that the anvils alternately have their working faces shifted to an active position relative to the hammers while their saw gripping faces coact with the inactive working face of the other anvil to hold the saw while its teeth are set.

11. Saw setting apparatus comprising supporting means, a pair of opposed anvils pivoted to the supporting means, each anvil having a saw gripping face and a working face arranged at an angle to the saw gripping face, a pair of opposed hammers pivoted to the supporting means and adapted to strike the saw teeth and to set them against the working faces of the anvils, movable feed dog means mounted upon the supporting means and engaging the saw teeth to advance the saw a tooth at a time between the anvils, adjustable means interconnecting the anvils so that the working face of one anvil may be swung to an active position offset from the other anvil while the working face of the other anvil is swung to an inactive position, the saw gripping face of said one anvil then coacting with the working face of said other anvil to grip the saw, and power driven operating means for said hammers, adjustable means and feed dog means.

12. Saw setting apparatus according to claim 11 wherein the saw gripping and work faces of each anvil form an obtuse angle with each other.

References Cited in the file of this patent

UNITED STATES PATENTS

| 767,130 | Addison | Aug. 9, 1904 |
| 1,565,675 | Root | Dec. 15, 1925 |
| 2,461,782 | Stadick | Feb. 15, 1949 |
| 2,467,595 | Paulson | Apr. 19, 1949 |